United States Patent [19]

Wachs et al.

[11] Patent Number: 4,864,822

[45] Date of Patent: Sep. 12, 1989

[54] CONTROL DEVICE FOR A HYDROSTATIC DRIVE FOR AT LEAST TWO ACTUATORS

[75] Inventors: Ewald Wachs, Illerkirchberg; Ludwig Wagenseil, Vöhringen; Wolfgang Reistle, Hörvelsingen, all of Fed. Rep. of Germany

[73] Assignee: Hydromatik GmbH, Elchingen, Fed. Rep. of Germany

[21] Appl. No.: 147,235

[22] Filed: Jan. 22, 1988

[30] Foreign Application Priority Data

Jan. 23, 1987 [DE] Fed. Rep. of Germany ....... 3702002

[51] Int. Cl.$^4$ ............................................. F16D 31/02
[52] U.S. Cl. ........................................ 60/427; 60/445
[58] Field of Search ................ 60/442, 445, 450, 452, 60/427, 426, 420

[56] References Cited

U.S. PATENT DOCUMENTS

| | | | |
|---|---|---|---|
| 3,579,987 | 5/1971 | Busse | 60/426 X |
| 3,914,939 | 10/1975 | Purdy | 60/445 X |
| 4,642,984 | 2/1987 | Dixen | 60/452 X |
| 4,712,376 | 12/1987 | Hadank et al. | 60/427 |
| 4,759,183 | 7/1988 | Kreth et al. | 60/422 |

FOREIGN PATENT DOCUMENTS

| | | |
|---|---|---|
| 1801137 | 4/1970 | Fed. Rep. of Germany . |
| 8100742 | 3/1981 | PCT Int'l Appl. .................. 60/426 |

Primary Examiner—Robert E. Garrett
Assistant Examiner—Mark A. Williamson
Attorney, Agent, or Firm—Scully, Scott, Murphy & Presser

[57] ABSTRACT

A control device for a hydrostatic drive for at least two actuators having a variable displacement pump whose adjusting device can be acted on as a function of the displacement and/or of the delivery pressure, wherein a control valve is associated with each actuator in its hydraulic supply line and the delivery flow for each actuator is determined by means of a pressure compensator as a function of the valve preset at the control valve, is simplified while ensuring accurate control. This is achieved by having the adjusting device always set the pump at a displacement which is slightly less than the sum of the actual instantaneous volume flows required by the actuators.

7 Claims, 2 Drawing Sheets

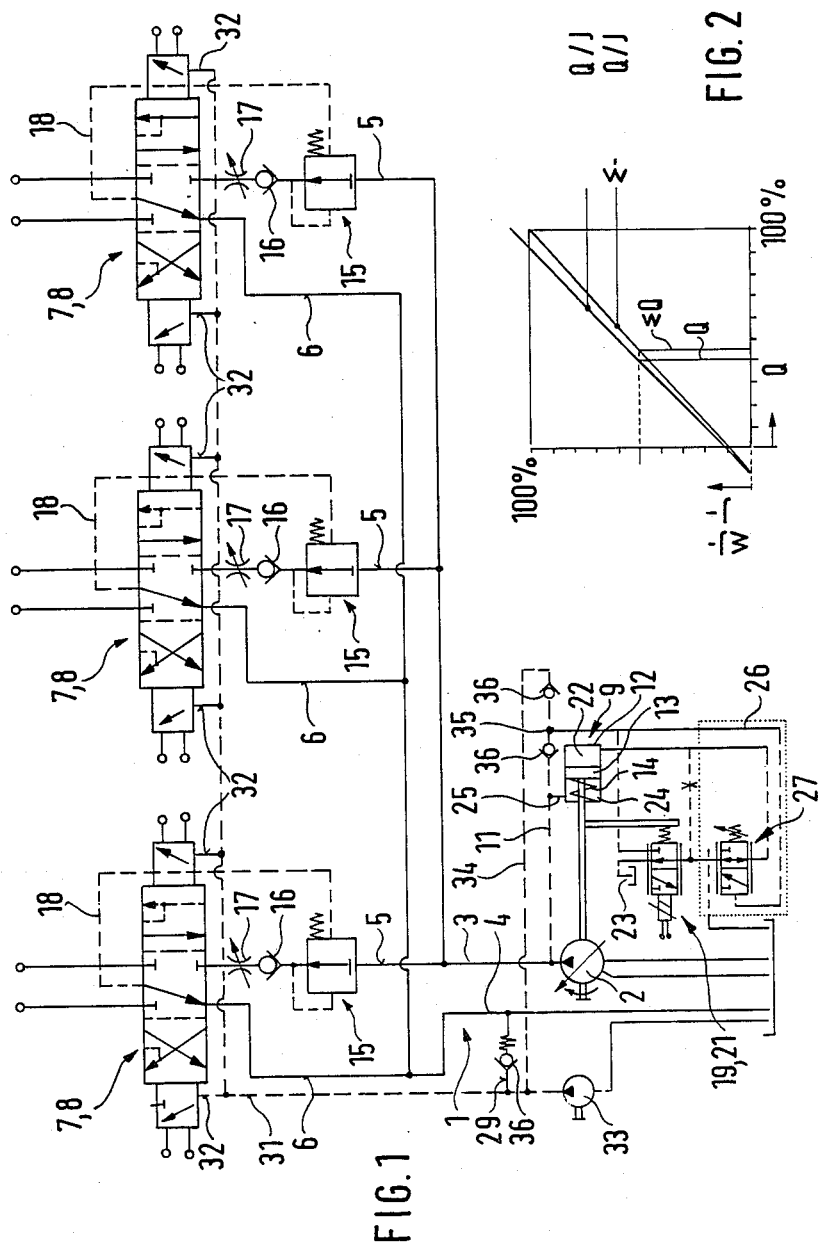

CONTROL DEVICE FOR A HYDROSTATIC DRIVE FOR AT LEAST TWO ACTUATORS

TECHNICAL FIELD OF THE INVENTION

The invention relates to a control device for a hydrostatic drive for at least two actuators having a variable displacement pump with an adjusting device which can be acted on as a function of the displacement and/or of the delivery pressure.

BACKGROUND OF THE INVENTION AND PRIOR ART

A control device of this kind is a so-called "load sensing" controller in which the fraction of the delivery flow which reaches each actuator is determined by means of a flow controller that is pressurized as a function of the opening area of the associated control valve. Thus the displacement setting of the pump is set as a function of the actuator loads, which are transmitted to the adjusting device of the pump by means of load-pressure feed-back lines.

The flow controller usually comprises so-called pressure compensators, which perform the flow control by ensuring a constant pressure difference of 10 to 20 bar. With this "load sensing" principle the delivery adjustment occurs with a pressure difference of approx. 10 to 20 bar from the load pressure values, which can result in oscillation problems. The above-mentioned upper limit of the pressure difference is relative to normal load pressure values of 400 bar.

OBJECT OF THE INVENTION

The object of the invention is to simplify a control device of the kind mentioned above whilst ensuring accurate control.

BRIEF DESCRIPTION OF THE INVENTION

This object is achieved in that the adjusting device of the variable displacement pump always sets the pump at a displacement which is less than the sum of the actual instantaneous volume flows which are required by the actuators.

In the arrangement according to the invention the sum of the requirements of the individual actuators is always greater than the flow delivered from the pump. This under-supply causes the pressure compensator of the actuator having the lightest load to open completely, so that both the pressure difference between the pump pressure and the load and also power loss are reduced. If, in the arrangement according to the invention, the actuator requirements are greater than the pump delivery set according to the invention, or if a power controller is engaged, each fraction of the delivery flow is reduced in proportion, so that the delivery to each of the actuators will be reduced. With a zero actuator demand, the pump is controlled to zero (Q and p=0).

The differences in delivery should be slight: more particularly, as small as possible. Tests have shown that good functioning can be obtained with a difference of less than about 0.1%, preferably about 0.02 to 0.05%.

While it is known per se from German Offenlegungsschrift 18 01 137, to control, in a control device for a hydrostatic drive, the deliveries of the pumps and the fraction of the delivery supplied to each actuator as a function of position pickups that are associated with the actuators and set their volume flows, with this arrangement pressure control does not occur. There is no pressure compensator. This state of the art differs essentially from the invention in respect of both problem and solution.

The features set forth by the present invention relate to control techniques which guarantee accurate control by simple and advantageous embodiments or arrangements. Various inventive aspects are concerned with the control of the pump, whilst other features relate to the control of the volume of the flow to the respective actuators; in essence, the provision of an electric or electronic control device which can allow for the reduction of the size of the controls according to the invention in a simple and space saving way.

Within the scope of the invention it is also possible, when an internal-combustion engine (diesel engine) is used as the driving motor for the pump, to include the maximum load control in the control system.

It is also possible to include an output control in the control system.

BRIEF DESCRIPTION OF THE DRAWINGS

The invention will now be described in more detail with reference to preferred exemplary embodiments shown in the accompanying drawings, wherein:

FIG. 1 shows a control device arranged according to the invention for a hydrostatic drive for three actuators, FIG. 2 shows a diagrammatic representation and FIG. 3 shows a control device arranged according to the invention as a second exemplary embodiment.

DETAILED DESCRIPTION

Figure 3:
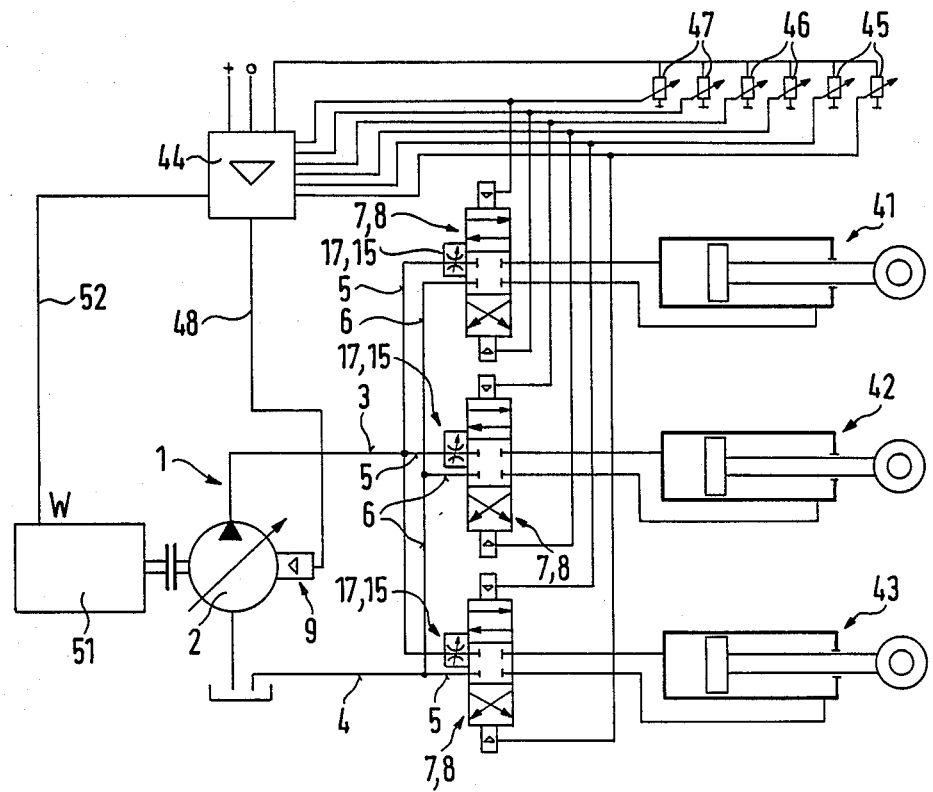

With regard to the hydrostatic drive, generally identified by 1 in the drawing, only the pump 2 and part of the open circuit are shown, namely the main line 3 and the return line 4. For the sake of simplicity, the actuators are not shown. Associated with each actuator is a main line section 5 and a return line section 6 in each of which there is installed a control valve 7 in the form of a proportional directional control valve 8. These are 5/3 way valves with a middle blocked position and lateral alternating positions for reversing the function of the associated actuator should this be necessary.

The pump 2 is a variable displacement pump which can be adjusted by a hydraulic adjusting device 9 which is connected to the main line 3 of the pump 2 by a hydraulic line 11 so that is adjustable by the delivery pressure of the pump 2. The adjusting device 9 comprises a hydraulic cylinder 12 whose adjusting piston 13 is hydraulically adjustable against a spring 14 and engages the displacement adjusting member of the pump 2. The control is a pressure control, i.e. with increasing pressure in the main line 3 the pump 2 is automatically adjusted to a correspondingly greater displacement.

Arranged in each main line section 5 leading to the associated control valve 7 is a flow control valve in the form of a so-called pressure compensator 15. Between the pressure compensator 15 and the control valves 7, in the direction of flow, there are first positioned another check valve 16 and an adjustable throttle 17 which is integrated in the control valve 7. The pressure compensator 15 is acted on, on one side thereof by the prevailing feed pressure in the associated main line section 5 and through a connecting line 18, by the prevailing load pressure behind the control valve 7. It is arranged so that a pressure difference of about 20 bar is maintained between the load pressure and the pump pressure with a load pressure of up to 400 bar.

The adjusting device 9 is associated with an adjusting member, generally denoted by 19, which is controlled as a function of the adjustment movement of the control valves 7 and thus acts to determine the delivery as a function of the setting of the control valves 7. The adjusting member 19 comprises an electromagnetic proportional valve 21 which is arrranged in the line 11 connecting the main line 3 to a working chamber 22 of the cylinder 12 and which controls the passage to this working chamber 22 and a return flow 23. In the present exemplary embodiment the other working chamber 24 of the cylinder 12 can also be acted on by the delivery pressure via a line 25. The spring 14 is arranged in the working chamber 24, which is formed by the piston ring chamber of the cylinder 12.

In a line section 26, parallel to the hydraulic line 11, a pressure limiting valve 27 for controlling the control device by means of a pressure cut-off is arranged in front of the adjusting member.

As previously explained, the control valves 7 comprise electro-hydraulic proportional valves. A control line 31 with line sections 32 leading to both sides of each control valve 7, serves to regulate the control valves 7 and is fed by an auxiliary pump 33 which is either driven by the same motor which drives the pump 2 or can have its own driving motor. The control line 31 is connected to the high pressure line 11 via a line section 34, check valves 36 being provided on both sides of the junction 35 as a safeguard. A similar connection is also provided by a line section 29 with a check valve 36 arranged between the control line 31 and the return line 4. The auxiliary pressure thus ensures a minimum pressure in the high pressure system and a return flow.

The control device has an electronic control arrangement associated therewith, not shown in the exemplary embodiment according to FIG. 1, which is connected to the control valves 7 at their ports and to the adjusting member 19 at its port by electric lines (not shown).

The control valves 7 are connected at their ports to setting members (also not shown) which can be used to adjust the volume flow which is to act on the respective actuators. Adjusting members of this kind can be potentiometers through which the operator presets the pressure which is to act on the actuators. By means of the electronic control arrangement the movement of setting of the control valves 7 is determined or also controlled and, as a function thereof the movement of the setting member 19 is controlled so that the displacement setting of the pump 2 depends on the preselected actuator volume flow. During this operation, in the control of the setting member 19 a reduction factor of 0.02 to 0.05% is taken into consideration, i.e. in setting the delivery of the pump 2 the sum of the actuator volume flows is adjusted by the factor 0.95 to 0.98. Because of this under-supply, this causes the opening of the inlet pressure compensator 15 which is associated with the actuator with the maximum load. The pressure difference between the load pressure and the displacement pressure is hereby reduced because of a slight under-supply. If the actuator requirement is greater than the possible pump flow or if a power regulator (not shown) is engaged, all the actuators will be throttled back proportionally so that all the actuators will be supplied with a continued, reduced flow. With an actuator requirement of zero the pump is regulated at zero (Q and p=0).

From the diagrammatic representation according to FIG. 2 there can be ascertained the performance curve of the volume flows of the pump and the volume flows in the region of the control valve 7. J represents the strength of the electric current which acts on the control valve 7 proper and is proportional to the associated volume flow.

Advantages of the embodiment according to the invention will now be described:

Simple arrangement. This means that there can be employed a simple electric-proportional adjustment or a high pressure adjustment with pressure cut-off.

No problems with the oscillations relating to the equipment as since, essentially, only the pump is regulated.

Avoidance of power loss at the actuator with the highest operating pressure.

No actuator pressure indicating lines are necessary, since the actuator with the highest load automatically communicates with the pump.

Stand-by pressure can be reduced to O-region as the pump is electrically controlled.

No problem of heating up of the pump in the standing by region.

FIG. 3 shows an exemplary embodiment corresponding in principle to the one described above, in which the three actuators in the form of piston-cylinder units and the electronic control device are indicated by 41 to 43 and 44. Corresponding parts are identified with the same numerals. The respective actuator voulme flows can be preselected by setting members which can comprise potentiometers 45 to 47 and are connected, via electric lines, to the control valves 7 or 8 and to the electronic regulating device 44 which regulates the adjusting device 9 by means of the electric line 48. The pump 2 is driven by a diesel motor 51. In the electronic regulating device 44 the maximum load control of this driving motor can also be included as a constant HP control. For this purpose, there is read the driving speed, e.g. at the terminal W of the diesel motor or from a speed meter, transmitted by means of the electric line 52 to the regulating device 44, and thence is communicated to the control valves 7, 8 via the electric lines without altering the ratios of the settings of the control valves 7, 8 to another corresponding to the individual settings of the potentiometers 45 to 47 (pick-up and adjustment members).

What is claimed is:

1. A control device for a hydrostatic drive for at least two actuators having a variable displacement pump whose adjusting device can be acted on as a function of the displacement or of the delivery pressure, a control valve being associated with each actuator in a hydraulic supply line thereof, pressure compensators for determining the delivery flow for each said actuator as a function of a value preset at the control valve, said pressure compensators being connected in parallel such that the same operating pressure acts thereon, the adjustment device always setting the pump at the displacement which is less than the sum of the actual instantaneous volume flow required by the actuators.

2. A control device according to claim 1, wherein the adjustment device has an adjustment member operating associated therewith and which is controlled as a function of the setting of the control control valves.

3. A control device according to claim 2, wherein the adjusting member is an electro-hydraulic proportional valve.

4. A control device according to claim 2, wherein an electronic control device is operatively connected with the control valves and the adjusting member.

5. A control device according to claim 1, wherein the control valves are electromagnetic proportional valves.

6. A control device according to claim 1, wherein the control valves are pilot valves acted on by an auxiliary pressure.

7. A control device according to claim 1, said pump being driven by an internal combustion engine, wherein the maximum load control of the drive is included in the control device as an output control of the drive.

* * * * *